US012722539B2

(12) United States Patent
Okada et al.

(10) Patent No.: US 12,722,539 B2
(45) Date of Patent: Sep. 1, 2026

(54) LINEAR ACTUATOR

(71) Applicant: TOYOTA BOSHOKU KABUSHIKI KAISHA, Kariya (JP)

(72) Inventors: Masaki Okada, Takahama (JP); Takayuki Ogasawara, Takahama (JP); Hiroaki Hyodo, Takahama (JP)

(73) Assignee: TOYOTA BOSHOKU KABUSHIKI KAISHA, Kariya (JP)

( * ) Notice: Subject to any disclaimer, the term of this patent is extended or adjusted under 35 U.S.C. 154(b) by 356 days.

(21) Appl. No.: 18/525,993

(22) Filed: Dec. 1, 2023

(65) Prior Publication Data

US 2024/0190301 A1 Jun. 13, 2024

(30) Foreign Application Priority Data

Dec. 12, 2022 (JP) ................................ 2022-197876

(51) Int. Cl.
*B60N 2/06* (2006.01)
*B60N 2/015* (2006.01)
*B60N 2/07* (2006.01)

(52) U.S. Cl.
CPC ............. *B60N 2/067* (2013.01); *B60N 2/015* (2013.01); *B60N 2/0722* (2013.01)

(58) Field of Classification Search
CPC ....... B60N 2/067; B60N 2/015; B60N 2/0722
See application file for complete search history.

(56) References Cited

U.S. PATENT DOCUMENTS 1,957,785 A * 5/1934 Knapp ................... B60N 2/067 248/394
4,516,663 A * 5/1985 D'Alessio ............... B66B 9/022 187/270
5,836,205 A * 11/1998 Meyer ..................... F16H 19/04 74/89.17
12,162,417 B2 * 12/2024 Mohammad ......... B60N 2/0272
2013/0233102 A1 * 9/2013 Meck ...................... F16H 55/28 74/89.17
2018/0334054 A1 * 11/2018 Higuchi ............. B60N 2/02246
2019/0168641 A1 * 6/2019 Higuchi ............. B60N 2/02246
2024/0191792 A1 * 6/2024 Okada ..................... F16H 55/26

FOREIGN PATENT DOCUMENTS

JP 2018-193007 A 12/2018

* cited by examiner

*Primary Examiner* — Jonathan Malikasim
(74) *Attorney, Agent, or Firm* — Oliff PLC

(57) ABSTRACT

A linear actuator may include a rail including a gear rack extending along a longitudinal direction of the rail and a pinion unit configured to slidably engage the gear rack. The gear rack may include at least one no-teeth section among a row of teeth and the at least one no-teeth section may extend over a length. The pinion unit may include two pinion gears both configured to engage the gear rack, the two pinion gears being spaced apart from each other by a center-to-center distance along the longitudinal direction; and an electric motor configured to drive the two pinion gears. The length may be equal to or longer than two pitches of the teeth of the gear rack and shorter than the center-to-center distance.

7 Claims, 8 Drawing Sheets

2
20
A
23
24
Z
X
Y
21
22
12
10
11
91
13
93
14

L2
2a
20
23
24
Z
X
Y
21
22
L3
Pt
10
14
L1
11
12a
15a
93
15b
12b
91

121
116
117
117
121a
112
115a
H2
H3
H1

LINEAR ACTUATOR

REFERENCE TO RELATED APPLICATION

This application claims priority to Japanese Patent Application No. 2022-197876 filed on Dec. 12, 2022, the contents of which are hereby incorporated by reference into the present application.

BACKGROUND ART

The disclosure herein relates to a linear actuator including a gear rack and pinion gears.

Linear actuators may be used to slide a seat of a vehicle in an electrically powered manner. Linear actuators are devices that allow a pinion unit to reciprocate along a rail. Linear actuators may be devices that allow a rail to reciprocate with respect to a pinion unit restrained on a floor.

A seat slider device described in Japanese Patent Application Publication No. 2018-193007 is one type of linear actuator. The seat slider device includes a lower rail attached to a floor of a vehicle and an upper rail fixed to a seat. The upper rail slidably engages the lower rail. The lower rail includes a gear rack, and the upper rail includes a pinion gear and a motor (an electric motor). The pinion gear of the upper rail engages the gear rack of the lower rail. By the motor driving the pinion gear, the upper rail including the pinion gear slides along the gear rack. That is, the seat slides along a longitudinal direction of the lower rail.

In the disclosure herein, a component including a gear rack is referred to as a rail, and a component including at least one pinion gear and a motor is referred to as a pinion unit. In an electrically powered seat slider device, its lower rail corresponds to the rail and its upper rail corresponds to the pinion unit. The linear actuator disclosed herein may be of a type in which its rail is fixed to a base of a machine and its pinion unit moves on the rail, or, may be a type in which its pinion unit is fixed to a base of a machine and its rail moves. For explanatory convenience, for both the types, an expression "a pinion unit slidably engages a gear rack (rail)" is used.

DESCRIPTION

An elongated rail includes a gear rack. Other components (e.g., a floor panel) are also fixed to the rail. Bolts for fixing the other components may interfere with the gear rack. For example, in case of an electrically powered seat slider device, a bottom plate of a rail (a lower rail) is fixed to a floor panel with bolts and a gear rack is fixed on the bottom plate. In this case, interference of the bolts with the gear rack may be avoided by defining notches in a lower surface of the gear rack which includes a row of teeth on its upper surface and placing the bolt heads in the notches. In this case, however, the gear rack has to be attached to the rail after the rail has been attached to the floor panel, which requires a lot of work. The disclosure herein provides a linear actuator in which a space for placing a component, such as a bolt, is secured in a row of teeth of a gear rack.

A linear actuator disclosed herein may comprise a rail including a gear rack extending along a longitudinal direction of the rail; and a pinion unit configured to slidably engage the gear rack. The gear rack may include at least one no-teeth section among a row of teeth and the at least one no-teeth section may extend over a length L1. The pinion unit may comprise two pinion gears both configured to engage the gear rack and an electric motor configured to drive the two pinion gears. The two pinion gears may be spaced apart from each other by a center-to-center distance L2 along the longitudinal direction. The length L1 may be equal to or longer than two pitches of the teeth of the gear rack and be shorter than the center-to-center distance L2.

The linear actuator disclosed herein includes the no-teeth section among the row of teeth of the gear rack. A component such as a bolt can be placed in this no-teeth section. Then, the pinion unit includes the two pinion gears so that the pinion unit can move across the no-teeth section. While one of the pinion gears is passing the no-teeth section, the other pinion gear maintains its engagement with the gear rack. The pinion unit can thus move across the no-teeth section. The no-teeth section may be a notch defined among the row of teeth of the single gear rack. Alternatively, the gear rack may include a first gear rack and a second gear rack that are aligned on a straight line, and these gear racks may be spaced apart from each other by the length L1. The space between the first gear rack and the second gear rack corresponds to the no-teeth section. If the linear actuator is used in a seat slider device, the rail corresponds to a lower rail and the pinion unit corresponds to an upper rail.

A distance between two end teeth located on both sides of the no-teeth section of the gear rack may be equal to an integral multiple of a pitch of the teeth of the gear rack. This allows the pinion gears to smoothly reengage the gear rack after passing the no-teeth section. The distance between two end teeth means a distance from the center of one of the end teeth to the center of the other end tooth.

The pinion unit may comprise a single idle gear, and the two pinion gears may engage the single idle gear. The two pinion gears coordinate with each other via the idle gear. This configuration allows the two pinion gears to easily rotate in a synchronized manner. By combining this feature with the feature that the distance between two end teeth located on both sides of the no-teeth section is equal to an integral multiple of a pitch of the teeth, the pinion gears can more smoothly reengage the gear rack after passing the no-teeth section.

A size of the end teeth (the teeth located on both sides of the no-teeth section) may be smaller than a size of the other teeth of the gear rack. A height of the end teeth may be greater than a distance between a bottom of a tooth of the gear rack and a tip of a tooth of the pinion gear when the pinion gear engages the gear rack. The smaller size of the end teeth than that of the other teeth allows the pinion gears to smoothly reengage the gear rack after passing the no-teeth section.

Details of the technique disclosed herein and further developments will be described in "EMBODIMENT".

EMBODIMENT

Figure 1:
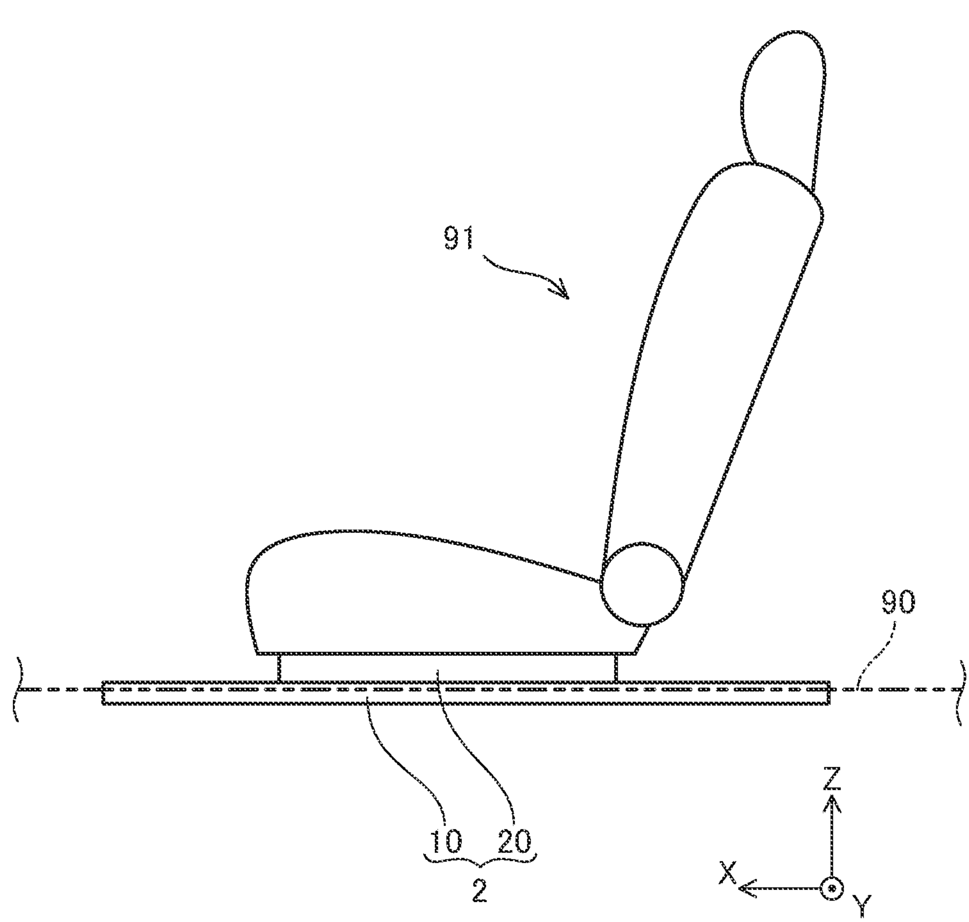
FIG. 1 is a side view of a seat including a linear actuator (a seat slider device) according to an embodiment.

Referring to the drawings, a linear actuator according to an embodiment is described. The linear actuator according to the embodiment is a seat slider device 2 disposed between a floor panel and a seat. FIG. 1 shows a side view of the seat slider device 2 attached to a floor panel 90 of a vehicle. The seat slider device 2 comprises a lower rail 10 and an upper rail 20. The lower rail 10 is elongated. The upper rail 20 is attached to the lower rail 10 such that the upper rail 10 is movable (slidable) with respect to the lower rail 10 in its longitudinal direction. The upper rail 20 can be moved by a motor along the lower rail 10, which will be described in detail later. When a user turns on a switch (not shown), the motor starts rotating and the upper rail 20 (the seat) is moved along the lower rail 10. The lower rail 10 corresponds to a rail of the linear actuator and the upper rail 20 corresponds to a pinion unit of the linear actuator.

The lower rail 10 is fixed to the floor panel 90 of a vehicle body. The upper rail 20 is attached to a lower portion of a seat 91. The upper rail 20 is attached to the lower portion of the seat 91 via a frame (not shown). A pair of seat slider devices 2 is attached to the single seat 91. The upper rails 20 are attached to left and right sides of the lower portion of the seat 91, respectively. The lower rails 10 are fixed to the floor panel 90 to correspond to the upper rails 20, respectively.

An X direction in the directional indicator in the drawings corresponds to a longitudinal direction of the lower rail 10 and the upper rail 20. The longitudinal direction of the rails (X direction) will be hereinafter referred to as a rail longitudinal direction. A Y direction in the directional indicator in the drawings corresponds to a short direction of the rails. The short direction of the rails will be hereinafter referred to as a rail short direction. A +Z direction in the directional indicator in the drawings indicates an upward direction.

Figure 2:
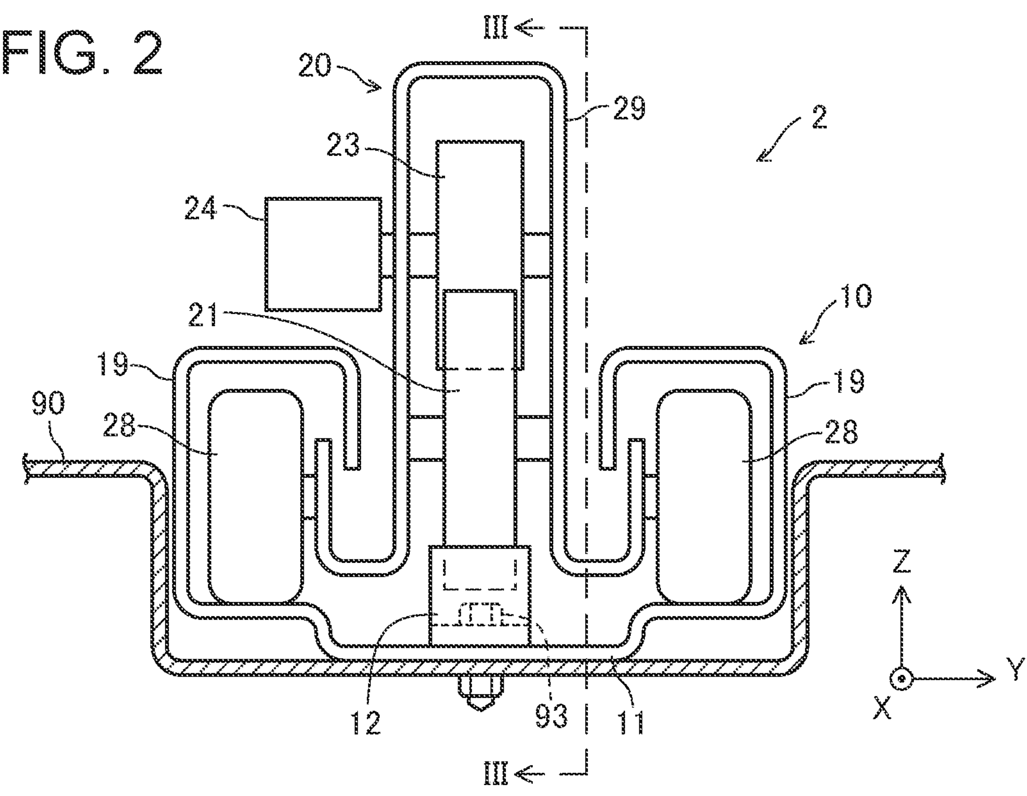
FIG. 2 is a front view of the seat slider device.
Figure 3:
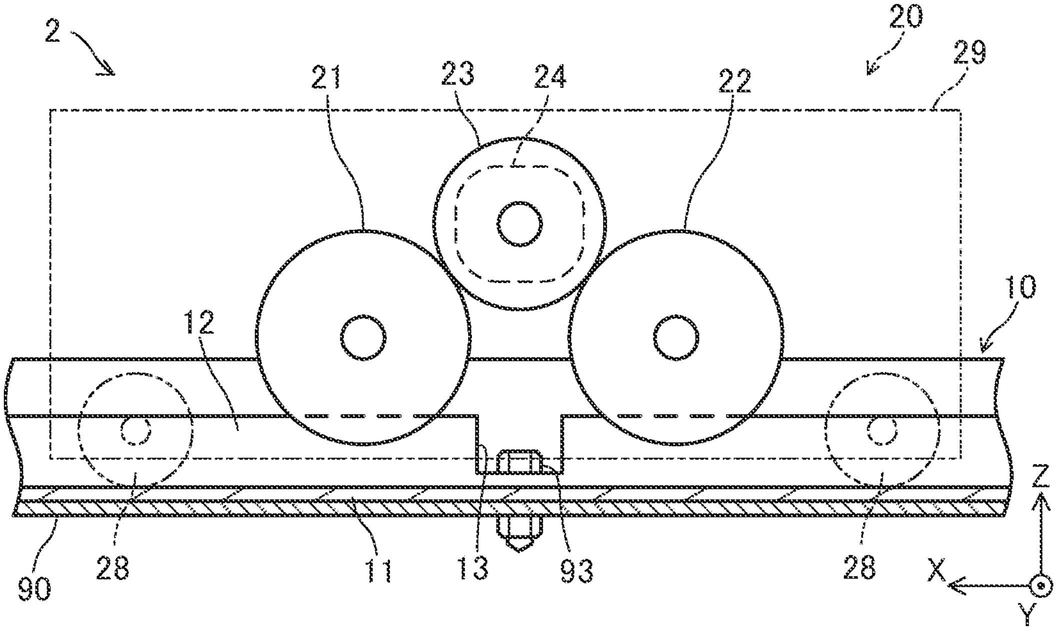
FIG. 3 is a side view of the seat slider device.

FIG. 2 shows a front view of the seat slider device 2. FIG. 2 shows the seat slider device 2 as viewed in the rail longitudinal direction. FIG. 3 shows a side view of the seat slider device 2. FIG. 3 shows a side view of the seat slider device 2 along a line III-III in FIG. 2.

The lower rail 10 has a channel-like cross sectional shape when cut along a plane orthogonal to the rail longitudinal direction. The lower rail 10 includes a bottom plate 11 and a pair of side plates 19 extending upward from both ends of the bottom plate 11 in the rail short direction. The lower rail 10 further includes a gear rack 12 extending along the rail longitudinal direction. The gear rack 12 is fixed to the bottom plate 11. In FIGS. 2 and 3, the depiction of gear teeth of the gear rack 12 is omitted.

A groove is defined in the floor panel 90 and the lower rail 10 is disposed in the groove of the floor panel 90. The lower rail 10 is fixed to the floor panel 90 with bolts. Hereinafter, the EMBODIMENT focuses on one bolt (a bolt 93). The head of the bolt 93 is disposed among a row of teeth of the gear rack 12 in the rail longitudinal direction. A notch 13, which is open upward, is defined in the gear rack 12 and the head of the bolt 93 is placed in the notch 13. The bolt 93 fastens the gear rack 12, the bottom plate 11, and the floor panel 90 together.

The upper rail 20 includes a plurality of rollers 28. The rollers 28 are located at four corners of a body 29 of the upper rail 20. The rollers 28 are in contact with the bottom plate 11 of the lower rail 10. The four rollers 28 allow the upper rail 20 to smoothly move along the lower rail 10. Upper portions of the side plates 19 of the lower rail 10 are curved in inverted U-shape and the rollers 28 are accommodated in spaces defined by the bottom plate 11 and the upper curved portions of the side plates 19. In FIG. 3, the body 29 of the upper rail 20 and the rollers 28 are depicted with imaginary lines.

The upper rail 20 includes two pinion gears (a first pinion gear 21 and a second pinion gear 22), one idle gear 23, and a motor 24. In FIGS. 2 and 3, the first pinion gear 21, the second pinion gear 22, and the idle gear 23 are depicted in a simplified manner and the depiction of gear teeth is omitted. The first pinion gear 21 and the second pinion gear 22 engage the gear rack 12, and the idle gear 23 engages both the first pinion gear 21 and the second pinion gear 22. The motor 24 drives the idle gear 23 via speed reduction gears (not shown). As the motor 24 drives the idle gear 23, the first pinion gear 21 and the second pinion gear 22 rotate in a synchronized manner in conjunction with the idle gear 23. When the first pinion gear 21 and the second pinion gear 22 are driven by the motor 24, the upper rail 20 is moved along the gear rack 12. That is, the upper rail 20 is moved on the lower rail 10 in an electrically powered manner.

Referring to FIGS. 4 to 7, how the gears engage each other is described. In FIGS. 4 to 7, the depiction of the body 29 of the upper rail 20 and the rollers 28 is omitted. The depiction of the side plates 19 of the lower rail 10 is also omitted. In FIGS. 4 to 7, there are gaps between the engaging gears but these gaps are provided only for convenience sake in order to facilitate understanding of the drawings. Naturally, backlash between two engaging gears should be as little as possible.

As described above, the notch 13 which is open upward is defined in the gear rack 12. There are no teeth in the range of the notch 13. The range of the notch 13 (i.e., the range without teeth) will be hereinafter referred to as a no-teeth section 14. The no-teeth section 14 is located among the row of teeth of the gear rack 12. The head of the bolt 93 is placed in the no-teeth section 14. The bolt 93 penetrates the bottom of the notch 13, the bottom plate 11 of the lower rail 10, and the floor panel 90 and fixes them together.

The no-teeth section 14 is provided in order to secure a space for placing the head of the bolt 93 on the narrow bottom plate 11. The no-teeth section 14 has a length L1 in the rail longitudinal direction. The length L1 is equal to or longer than two pitches of the teeth of the gear rack 12. In FIGS. 4 to 7, the gear teeth are depicted by an imaginary line also within the no-teeth section 14 to facilitate understanding of the relationship between the length L1 and tooth pitch. The reference sign Pt in FIG. 4 indicates a tooth pitch. In the present embodiment, the length L1 of the no-teeth section 14 is longer than twice the teeth pitch Pt and shorter than three times the teeth pitch Pt.

The two pinion gears (the first pinion gear 21 and the second pinion gear 22) are attached to the upper rail 20. The two pinion gears are arranged along the rail longitudinal direction. The two pinion gears are spaced apart from each other by a center-to-center distance L2 along the rail longitudinal direction. The two pinion gears (the first pinion gear 21 and the second pinion gear 22) have the same shape. The two pinion gears (the first pinion gear 21 and the second pinion gear 22) have the same diameter and the same number of teeth. As described above, the idle gear 23 engages both the first pinion gear 21 and the second pinion gear 22, and the motor 24 drives the first pinion gear 21 and the second pinion gear 22 via the idle gear 23. Since the first pinion gear 21 and the second pinion gear 22, which have the same shape, rotate in a synchronized manner via the single idle gear 23, they smoothly rotate while engaging the gear rack 12.

In FIGS. 4 to 7, it is assumed that the upper rail 20 moves in a direction indicated by a bold arrow A (leftward). However, for the sake of expedience, the lower rail 10 is depicted as if it gradually moves from the left to right, from FIG. 4 through FIG. 7, and thus the no-teeth section 14 is depicted as if it gradually moves from the left to right, from FIG. 4 through FIG. 7.

Figure 4:
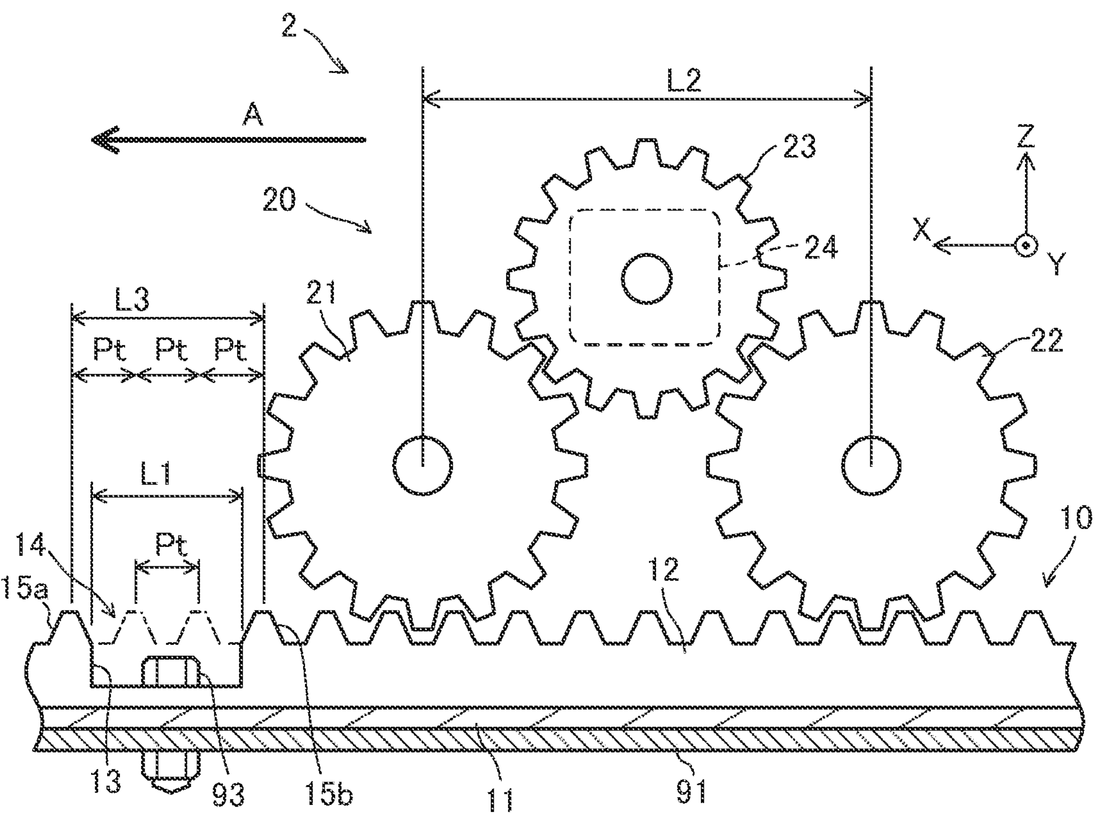
FIG. 4 is a diagram (1) illustrating how a gear rack and two pinion gears engage each other.
Figure 5:
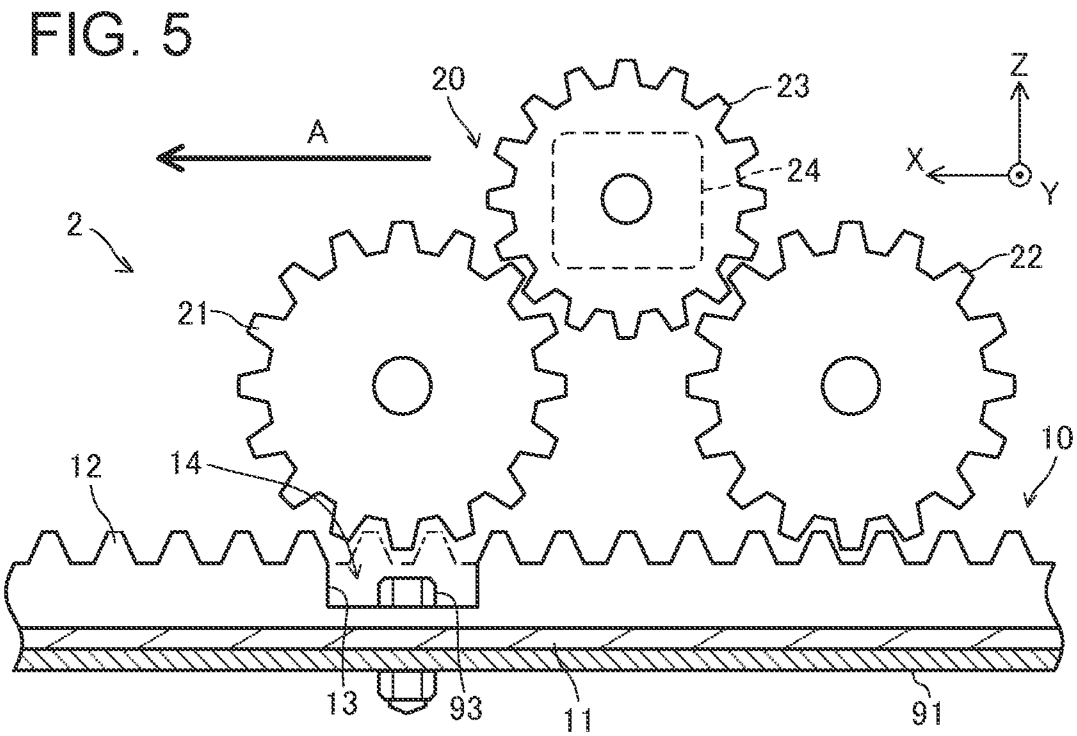
FIG. 5 is a diagram (2) illustrating how the gear rack and the two pinion gears engage each other.

In FIG. 4, the no-teeth section 14 is located forward of the upper rail 20 in its direction of movement. The length L1 of the no-teeth section 14 is equal to or longer than two teeth pitches Pt of the gear rack 12. Therefore, when the first pinion gear 21 reaches the no-teeth section 14, the first pinion gear 21 disengages from the gear rack 12 and spins freely (FIG. 5). However, the upper rail 20 can keep moving because the second pinion gear 22 is in engagement with the gear rack 12.

Figure 6:
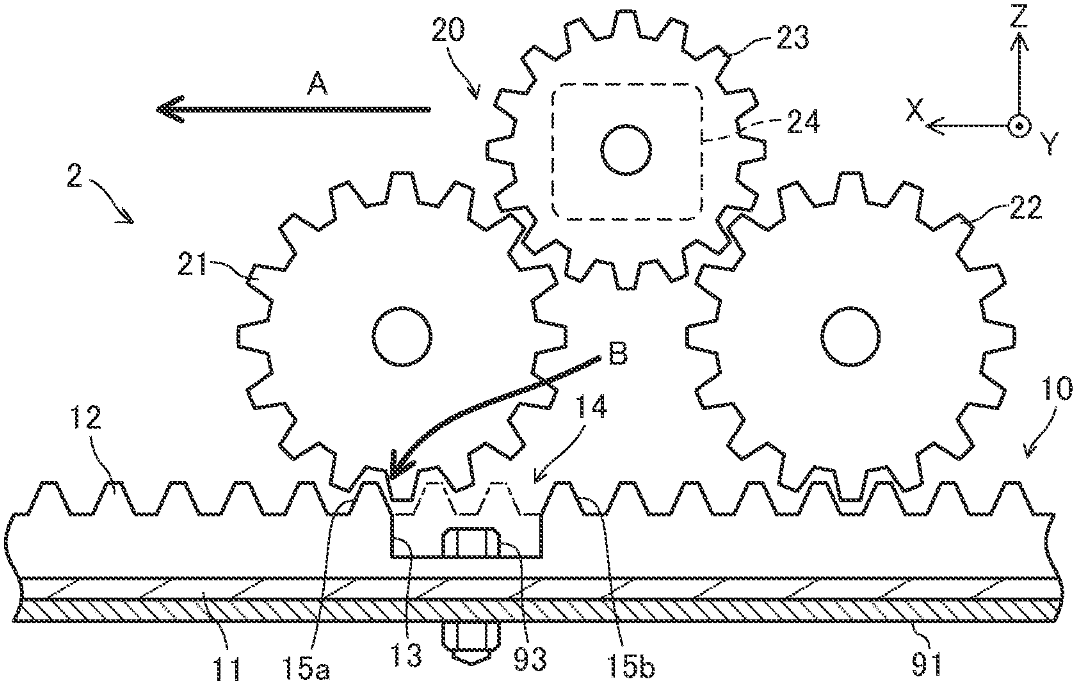
FIG. 6 is a diagram (3) illustrating how the gear rack and the two pinion gears engage each other.

As the upper rail 20 moves further, the first pinion gear 21 reengages the gear rack 12 (FIG. 6). A distance L3 between two end teeth 15*a*, 15*b* located on both sides of the no-teeth section 14 is an integral multiple of the teeth pitch Pt. As shown in FIG. 4, in the present embodiment, the distance L3 is three times the teeth pitch Pt. The distance L3 between the two end teeth 15*a*, 15*b* means a distance from the center of one end tooth 15*a* to the center of the other end tooth 15*b*. Thus, after passing the no-teeth section 14 while spinning freely, the first pinion gear 21 can smoothly reengage the gear rack 12. The site pointed by a bold arrow B in FIG. 6 indicates the reengagement point of the end tooth 15*a* and the first pinion gear 21. Although the first pinion gear 21 spins freely while passing the no-teeth section 14, the end tooth 15*a* fits in a tooth groove of the first pinion gear 21 when the first pinion gear 21 reengages the gear rack 12.

Figure 7:
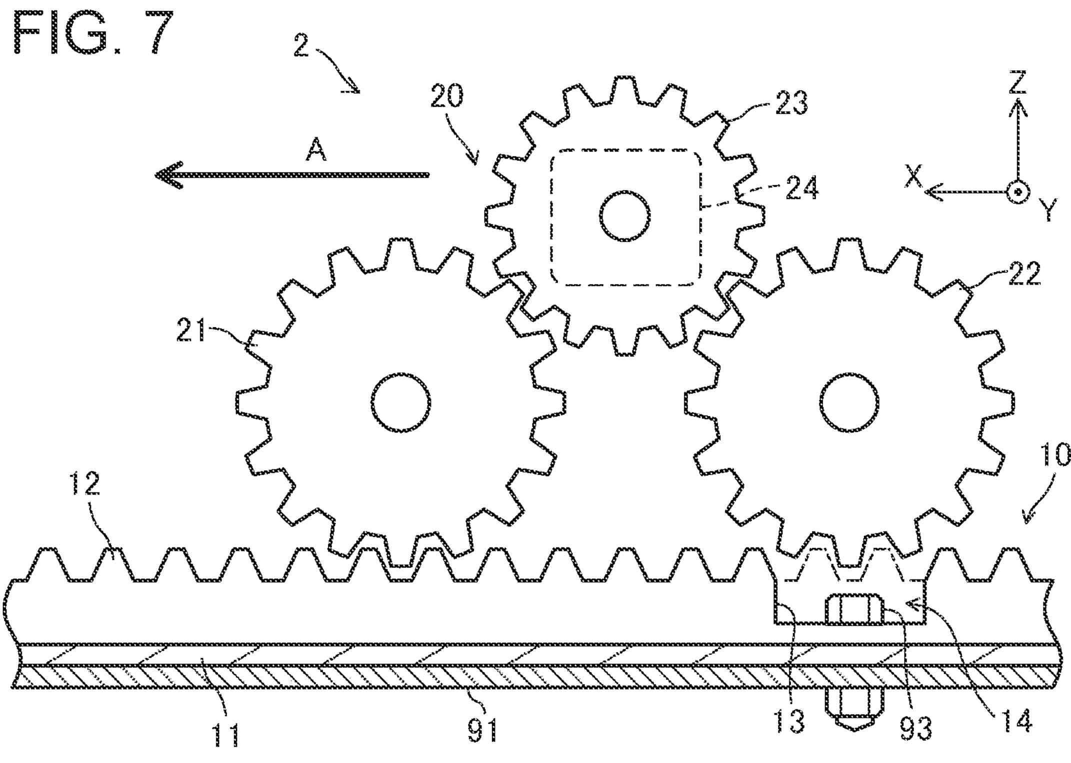
FIG. 7 is a diagram (4) illustrating how the gear rack and the two pinion gears engage each other.

As the upper rail 20 moves further leftward, the second pinion gear 22 passes the no-teeth section 14 (FIG. 7). At this time, the second pinion gear 22 spins freely, however, the upper rail 20 can keep moving forward because the first pinion gear 21 is in engagement with the gear rack 12. As with the case of the first pinion gear 21, the second pinion gear 22 can also smoothly reengage the gear rack 12.

As described above, in the seat slider device 2 according to the embodiment, the bolt 93 can be placed among the row of teeth of the gear rack 12 since the no-teeth section 14 is provided in the gear rack 12. The upper rail 20 including the two pinion gears (the first pinion gear 21 and the second pinion gear 22) can smoothly move across the no-teeth section 14. The length L1 of the no-teeth section 14 is shorter than the center-to-center distance L2 of the two pinion gears (the first pinion gear 21 and the second pinion gear 22). This is because the both pinion gears enter the no-teeth section if the no-teeth section 14 is longer than the center-to-center distance L2. The distance L3 between the two end teeth 15*a*, 15*b* may be shorter than the center-to-center distance L2. Another component other than a bolt may be placed in the no-teeth section 14.

Variants

Figure 8:
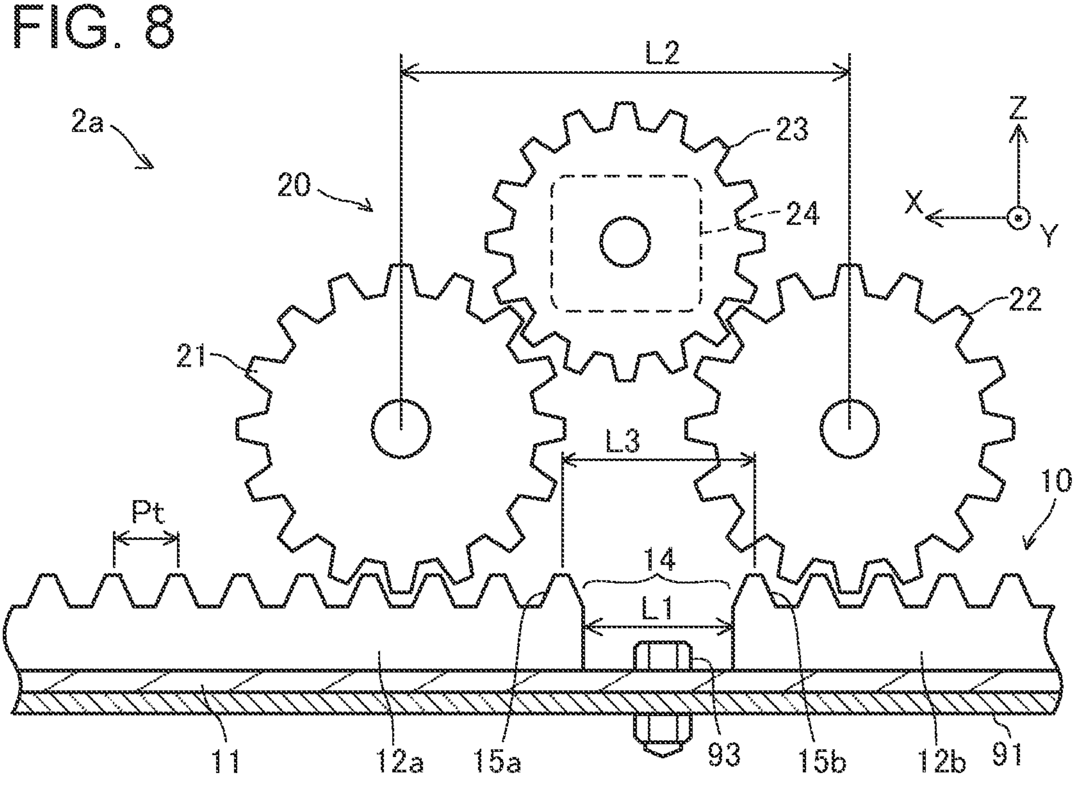
FIG. 8 is a diagram illustrating a variant of the seat slider device.

Referring to FIG. 8, a seat slider device 2*a* according to a variant will be described. An upper rail 20 of the seat slider device 2*a* is the same as the upper rail 20 of the seat slider device 2 according to the embodiment. The depiction of the body of the upper rail 20 and rollers is omitted in FIG. 8. The seat slider device 2*a* according to the variant includes two gear racks 12*a*, 12*b*. The two gear racks 12*a*, 12*b* are spaced apart from each other by a length L1 in the rail longitudinal direction. The space of the length L1 between the two gear racks 12*a*, 12*b* corresponds to a no-teeth section 14. The head of a bolt 93 is placed in the no-teeth section 14. The length L1 is equal to or longer than two pitches of teeth of the gear racks and shorter than a center-to-center distance L2 of two pinion gears. Further, a distance L3 between end teeth 15*a*, 15*b* located on both sides of the no-teeth section 14 is equal to an integral multiple of a pitch of teeth of the gear racks 12*a*, 12*b*. The distance L3 is shorter than the center-to-center distance L2.

The seat slider device 2*a* is also moved by the motor 24 in an electrically powered manner. In the seat slider device 2*a* as well, the upper rail 20 can smoothly move across the no-teeth section 14.

Next, referring to FIGS. 9 to 14, various shapes of an end tooth of a gear rack will be described. A gear rack 112 shown in FIGS. 9 to 14 corresponds to the gear rack 12 shown in FIGS. 2 to 8. A pinion gear 121 shown in FIGS. 9 to 14 corresponds to the first pinion gear 21 shown in FIGS. 2 to 8. A pinion gear 121*a* depicted by an imaginary line represents the pinion gear 121 which is about to engage the gear rack 112 from the right.

With respect to FIGS. 9 to 14, a tooth located at an end of the gear rack 112 is referred to as an end tooth 115 (115*a*, 115*b*, 115*c*), a tooth adjacent to the end tooth 115 is referred to as an adjacent tooth 116 (116*a*, 116*b*, 116*c*), and the teeth other than the end tooth and the adjacent tooth are referred to as normal teeth 117. The end tooth 115 may be a tooth located adjacent to a no-teeth section.

Figures 9, 10:
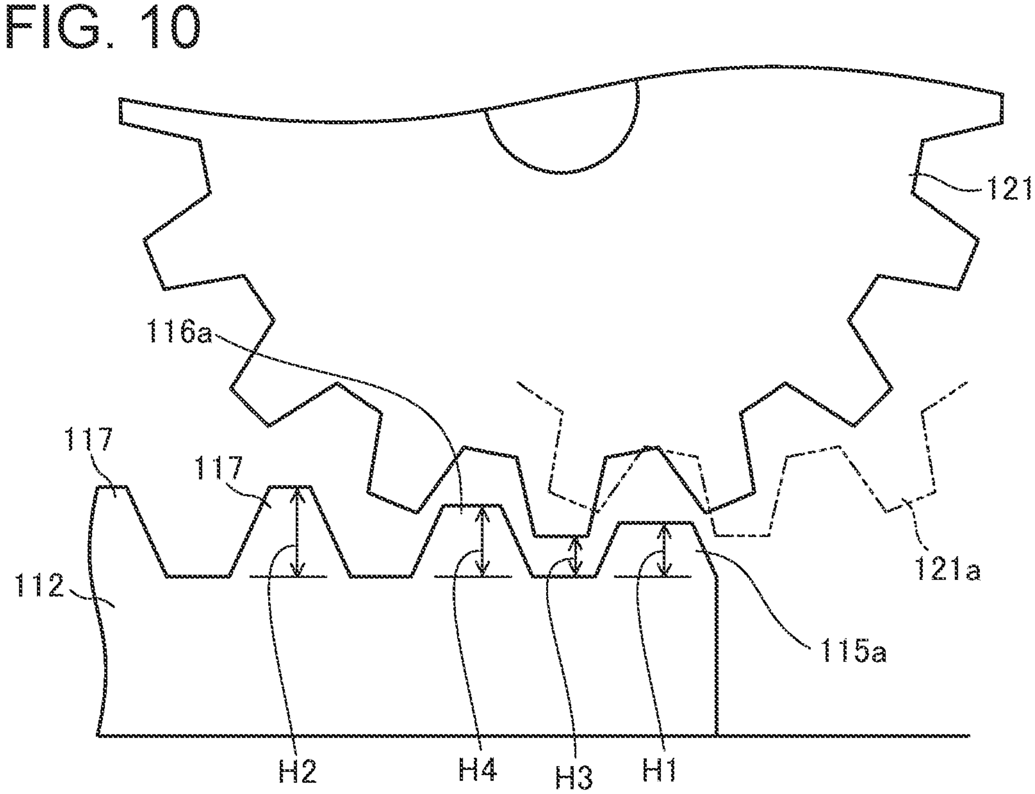
FIG. 9 is a side view of an end portion of a gear rack (first variant of the gear rack).
FIG. 10 is a side view of an end portion of a gear rack (second variant of the gear rack).

In the variant of FIG. 9, in the side view of the gear rack 112, the size of an end tooth 115*a* is smaller than the size of normal teeth 117. In the example of FIG. 9, an adjacent tooth 116 has the same size as that of the normal teeth 117. A height H1 of the end tooth 115*a* is lower than a height H2 of the normal teeth 117. The height H1 of the end tooth 115*a* is larger than a distance H3 between the bottom of a tooth of the gear rack 112 and a tip of a tooth of the pinion gear 121 that is in engagement with the gear rack 112. The smaller size of the end tooth 115*a* allows the pinion gear 121 to easily engage the gear rack 112 after passing the no-teeth section. The condition "height H1>distance H3" is required for the pinion gear 121 to engage the end tooth 115*a*.

In the variant of FIG. 10, in the side view of the gear rack 112, the size of the end tooth 115*a* is smaller than the size of the normal teeth 117, and the size of the adjacent tooth 116*a* is larger than the size of the end tooth 115*a* and smaller than the size of the normal teeth 117. The height H1 of the end tooth 115*a* is lower than the height H2 of the normal teeth 117. The height H1 of the end tooth 115*a* is larger than the distance H3 between the bottom of a tooth of the gear rack 112 and a tip of a tooth of the pinion gear 121 that is in engagement with the gear rack 112. A height H4 of the adjacent tooth 116*a* is higher than the height H1 of the end tooth 115*a* and lower than the height H2 of the normal teeth 117. The gradually decreasing heights of the teeth from the center toward the end of the gear rack 112 allows the pinion gear 121 to easily engage the gear rack 112 when it reaches the end of the gear rack 112.

Figure 11:
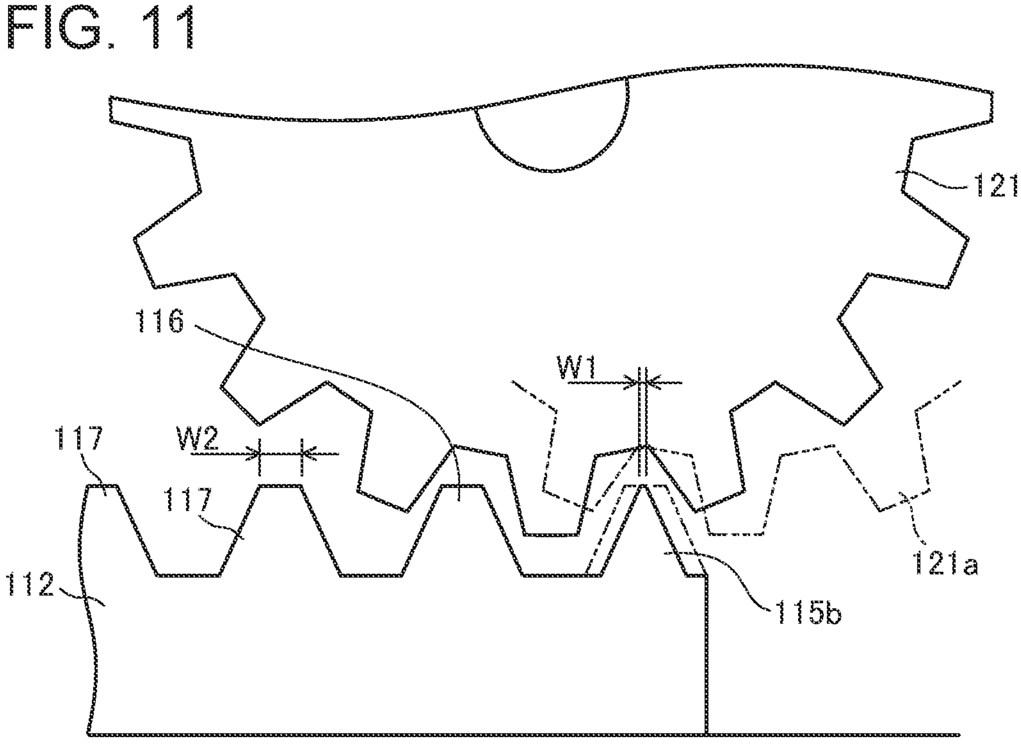
FIG. 11 is a side view of an end portion of a gear rack (third variant of the gear rack).

In the variant of FIG. 11, in the side view, a tip width W1 of an end tooth 115*b* is narrower than a tip width W2 of normal teeth 117, i.e., tip width W1<tip width W2. In the variant of FIG. 11, an adjacent tooth 116 has the same shape as that of the normal teeth 117. The narrower tip width W1 of the end tooth 115*b* also allows the pinion gear 121 to easily engage the gear rack 112 after it passes the no-teeth section.

Figure 12:
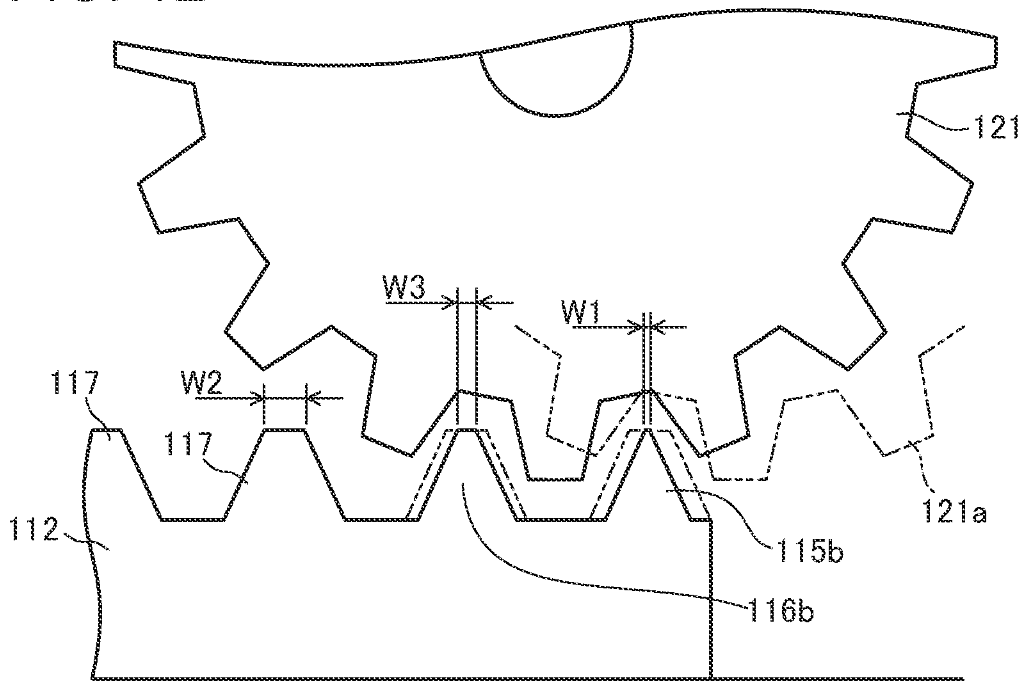
FIG. 12 is a side view of an end portion of a gear rack (fourth variant of the gear rack).

In the variant of FIG. 12, in the side view, the tip width W1 of the end tooth 115*b* is narrower than the tip width W2 of the normal teeth 117, i.e., tip width W1>tip width W2. Further, a tip width W3 of an adjacent tooth 116*b* is larger than the tip width W1 and narrower than the tip width W2, i.e., W1<W3<W2. The gradually narrowing tip widths of the teeth from the center toward the end of the gear rack 112 also allows the pinion gear 121 to easily engage the gear rack 112 when it reaches the end of the gear rack 112.

Figure 13:
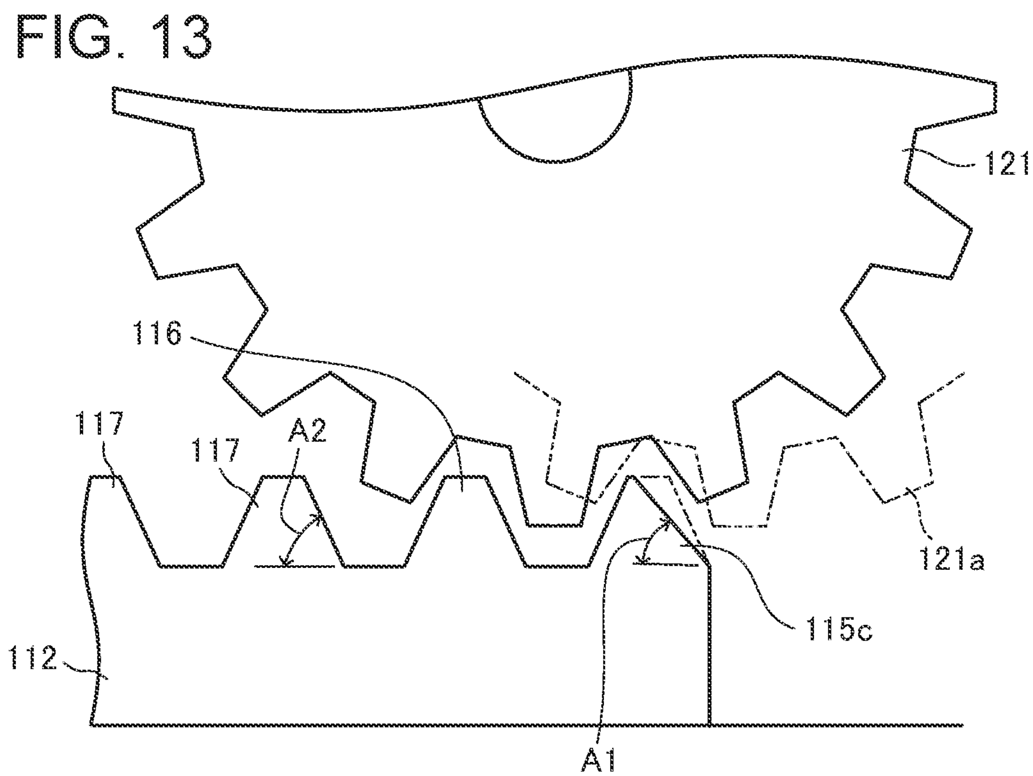
FIG. 13 is a side view of an end portion of a gear rack (fifth variant of the gear rack).

In the variant of FIG. 13, in the side view, an angle A1 of a side surface of an end tooth 115*c* that is located closer to the end of the gear rack is smaller than an angle A2 of side surfaces of normal teeth 117, i.e., angle A1<angle A2. In the variant of FIG. 13, an adjacent tooth 116 has the same shape as that of the normal teeth 117. The smaller angle A1 of the side surface of the end tooth 115*c* also allows the pinion gear 121 to easily engage the gear rack 112 after it passes the no-teeth section.

Figure 14:
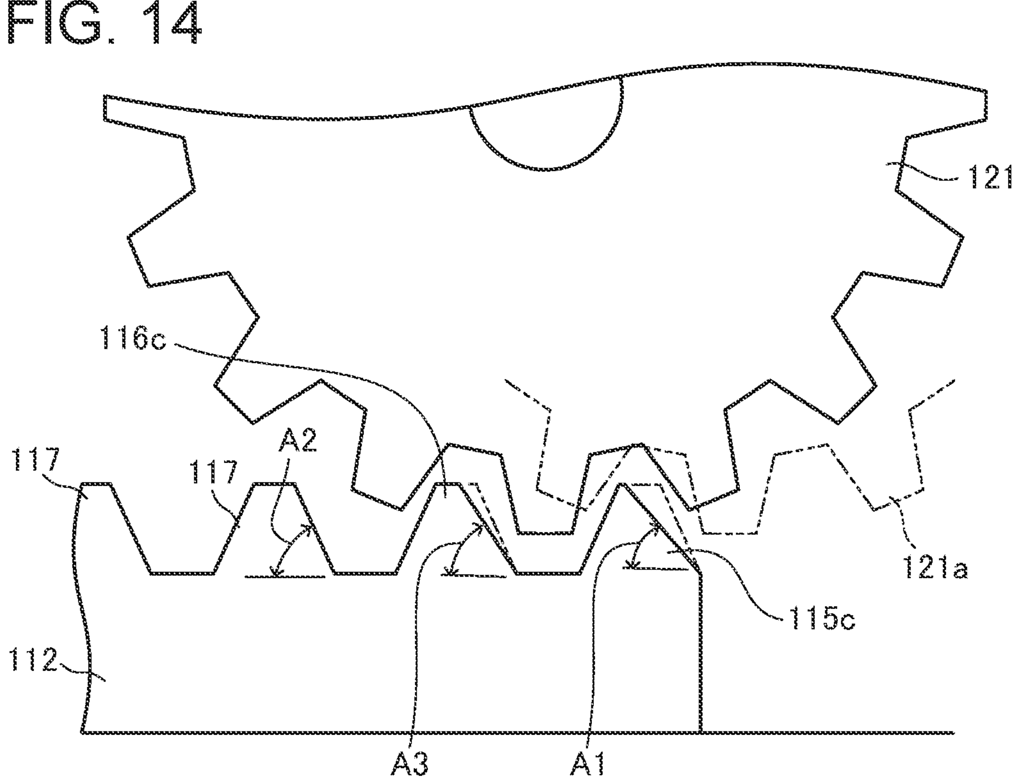
FIG. 14 is a side view of an end portion of a gear rack (sixth variant of the gear rack).

In the variant of FIG. 14, in the side view, the angle A1 of the side surface of the end tooth 115*c* that is located closer to the end of the gear rack is smaller than the angle A2 of side surfaces of the normal teeth 117. Further, an angle A3 of a side surface of an adjacent tooth 116*c* that is located closer to the end of the gear rack is larger than the angle A1 and smaller than the angle A2, i.e., angle A2>angle A3>angle A1. The gradually decreasing angles of side surfaces of the teeth from the center toward the end of the gear rack 112 allows the pinion gear 121 to easily engage the gear rack 112 when it reaches the end of the gear rack 112. The angles A1, A2, and A3 are angles of the side surfaces of the teeth relative to the rail longitudinal direction.

The height of the end tooth may be lower than the height of the normal teeth and the tip width of the end tooth may be narrower than the tip width of the normal teeth. The height of the end tooth may be lower than the height of the normal teeth and the angle of the side surface of the end tooth may be smaller than the angle of side surfaces of the normal teeth. The tip width of the end tooth may be narrower than the tip width of the normal teeth and the angle of the side surface of the end tooth may be smaller than the angle of side surfaces of the normal teeth. The height of the end tooth may be lower than the height of the normal teeth, the angle of the side surface of the end tooth may be smaller than the angle of side surfaces of the normal teeth, and the tip width of the end tooth may be narrower than the tip width of the normal teeth.

The followings are points to note regarding the technology described in the embodiment. The two pinion gears (the first pinion gear 21 and the second pinion gear 22) engage the single idle gear 23. In this configuration, the two pinion gears rotate exactly in a synchronized manner. Therefore, each of the two pinion gears smoothly engages the gear rack 12.

In the embodiment, the motor 24 directly drives the idle gear 23. The motor 24 may directly drive the first pinion gear 21 (or the second pinion gear 22). Even if the motor 24 directly drives the first pinion gear 21 (or the second pinion gear 22), the second pinion gear 22 (the first pinion gear 21) is rotated via the idle gear 23. In this case as well, the first pinion gear 21 and the second pinion gear 22 rotate in a synchronized manner.

It is preferable that the two pinion gears (the first pinion gear 21 and the second pinion gear 22) engage the single idle gear 23, however, the two pinion gears (the first pinion gear 21 and the second pinion gear 22) may coordinate with each other via a plurality of idle gears 23. In this case, however, the two pinion gears are required to have the same shape and rotate at the same speed.

A plurality of no-teeth sections may be provided on a single gear rack. The lower rail may include three or more gear racks. Gear racks adjacent to each other in the rail longitudinal direction may be spaced apart from each other by the length L1. A distance between a pair of end teeth located on both sides of a no-teeth section (the distance L3 in FIG. 4) may be equal to an integral multiple of a pitch of the teeth of the gear rack 112 and shorter than the center-to-center distance L2 of the two pinion gears.

The application of a linear actuator in which two pinion gears engage a gear rack is not limited to seat slider devices. The linear actuator disclosed herein has the following features. The linear actuator comprises a rail including a gear rack extending along a longitudinal direction of the rail and a pinion unit configured to slidably engage the gear rack. The gear rack includes at least one no-teeth section among its row of teeth and the at least one no-teeth section extends over a length L1. The pinion unit comprises two pinion gears both configured to engage the gear rack and an electric motor configured to drive the two pinion gears. The two pinion gears are spaced apart from each other by a center-to-center distance L2 along the longitudinal direction. The length L1 is equal to or longer than two pitches of the teeth of the gear rack and is shorter than the center-to-center distance L2. A distance L3 between a pair of end teeth located on both sides of the no-teeth section may be smaller than the center-to-center distance L2. In this linear actuator, the pinion unit can move across the no-teeth section.

The pinion unit can be moved relative to the rail (the gear rack) by the motor. The pinion unit may be fixed to a floor and the rail may move, or the rail may be fixed to a floor and the pinion unit may move.

The pinion unit may comprise rollers for smooth movement along the rail. The pinion unit is restrained such that it can move along the rail. The rollers 28 of the pinion unit (the upper rail 20) are components that restrain the pinion unit such that it can move in the rail longitudinal direction.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A linear actuator comprising:

a rail including a gear rack extending along a longitudinal direction of the rail; and a pinion unit configured to slidably engage the gear rack; wherein the gear rack includes at least one no-teeth section among a row of teeth, the at least one no-teeth section extending over a length;

the pinion unit comprises:

two pinion gears both configured to engage the gear rack, the two pinion gears being spaced apart from each other by a center-to-center distance along the longitudinal direction, and an electric motor configured to drive the two pinion gears;

the length is equal to or longer than two pitches of the teeth of the gear rack and is shorter than the center-to-center distance; and in the at least one no-teeth section, the gear rack has no teeth from one end to the other end of the rail in a short direction of the rail.

2. The linear actuator of claim 1, wherein a distance between two end teeth located on both sides of the no-teeth section is equal to an integral multiple of a pitch of the teeth of the gear rack.

3. The linear actuator of claim 2, wherein the two pinion gears engage an idle gear.

4. The linear actuator of claim 1, wherein the two pinion gears engage an idle gear.

5. The linear actuator of claim 1, wherein a size of an end tooth of the gear rack located adjacent to the no-teeth section is smaller than a size of other teeth of the gear rack, and a height of the end tooth is greater than a distance between a bottom of a tooth of the gear rack and a tip of a tooth of the pinion gear when the pinion gear engages the gear rack.

6. The linear actuator of claim 1, wherein the gear rack includes a first gear rack and a second gear rack, and the first gear rack and the second gear rack are spaced apart from each other by the length along the longitudinal direction.

7. The linear actuator of claim 1, wherein the rail is a lower rail fixed to a floor panel of a vehicle, the pinion unit is an upper rail attached to a bottom of a seat, and the lower rail and the upper rail constitute a seat slider device which slides the seat with respect to the floor panel.

* * * * *